United States Patent
Neuss et al.

(10) Patent No.: US 6,422,633 B2
(45) Date of Patent: Jul. 23, 2002

(54) CROSS MEMBER IN A HYBRID CONSTRUCTION AND METHOD OF MAKING SAME

(75) Inventors: Sabine Neuss, Freiberg/Neckar; Thomas Reddig, Bietigheim-Bissingen; Walter Wolf, Oppenweiler-Zell, all of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/812,678

(22) Filed: Mar. 21, 2001

(30) Foreign Application Priority Data

Mar. 24, 2000 (DE) .......................................... 100 14 606

(51) Int. Cl.⁷ .............................................. B62D 25/14
(52) U.S. Cl. .............................. 296/70; 296/194; 180/90
(58) Field of Search ..................... 296/70, 194, 190.09, 296/192, 188, 901, 203.02, 208, 72; 180/90; 280/282.29

(56) References Cited

U.S. PATENT DOCUMENTS

| | | | |
|---|---|---|---|
| 4,223,754 A | * 9/1980 | Mizuno et al. | 180/90 |
| 4,559,868 A | * 12/1985 | Nonaka et al. | 180/90 |
| 4,717,195 A | * 1/1988 | Okuyama et al. | 180/90 |
| 4,733,739 A | * 3/1988 | Lorenz et al. | 180/90 |
| 5,082,078 A | * 1/1992 | Umeda et al. | 180/90 |
| 5,311,960 A | * 5/1994 | Kukainis et al. | 180/90 |

(List continued on next page.)

FOREIGN PATENT DOCUMENTS

| | | |
|---|---|---|
| DE | 31 43 503 | 6/1982 |
| DE | 33 10 886 | 9/1984 |
| DE | 34 47 185 | 6/1986 |
| DE | 42 32 847 | 3/1994 |
| DE | 4232847 | 3/1994 |
| DE | 44 09 081 | 4/1995 |
| DE | 197 14 051 | 10/1997 |
| DE | 196 20 921 | 11/1997 |
| DE | 197 53 878 | 6/1998 |
| DE | 694 20 829 | 9/1999 |
| DE | 29916466 | 1/2000 |
| DE | 299 16 466 | 1/2000 |
| DE | 29916467 | 1/2000 |
| EP | 0141959 A1 * | 9/1984 |
| EP | 0 370 342 | 5/1990 |
| EP | 0370342 | 5/1990 |
| EP | 0607585 A1 * | 12/1993 |
| FR | 1322241 | 2/1962 |
| FR | 2697475 | 5/1994 |
| JP | 10-272966 | 10/1998 |
| JP | 11-192972 * | 7/1999 |

OTHER PUBLICATIONS

Copy of Search Report.

*Primary Examiner*—Stephen T. Gordon
*Assistant Examiner*—Kiran B. Pate
(74) *Attorney, Agent, or Firm*—Crowell & Moring, LLP

(57) ABSTRACT

A cross member in a hybrid motor vehicle construction is arranged between A-columns of a motor vehicle. The cross member has a basic body which is widened in a center area at least on one side and is designed as part of a housing of a heating and/or air conditioning system.

26 Claims, 7 Drawing Sheets

U.S. PATENT DOCUMENTS

| | | | | |
|---|---|---|---|---|
| 5,312,133 A | * | 5/1994 | Pietila et al. | 180/90 |
| 5,364,159 A | | 11/1994 | Kelman et al. | 296/192 |
| 5,556,153 A | * | 9/1996 | Kelman et al. | 180/90 |
| 5,564,515 A | * | 10/1996 | Schambre | 180/90 |
| 5,580,122 A | | 12/1996 | Muehlhausen | 296/194 |
| 5,673,964 A | * | 10/1997 | Roan et al. | 296/194 |
| 5,685,595 A | * | 11/1997 | Nishijima et al. | 180/90 |
| 5,685,598 A | * | 11/1997 | Inoue et al. | 180/90 |
| 5,707,100 A | * | 1/1998 | Suyama et al. | 180/90 |
| 5,709,601 A | * | 1/1998 | Heck | 296/70 |
| 5,762,395 A | * | 6/1998 | Merrifield et al. | 180/90 |
| 5,934,744 A | * | 8/1999 | Jergens et al. | 296/70 |
| 5,938,266 A | | 8/1999 | Dauvergne et al. | 296/70 |
| 5,967,598 A | | 10/1999 | Eilemann et al. | 296/208 |
| 5,979,965 A | * | 11/1999 | Nishijima et al. | 296/70 |
| 6,073,987 A | * | 6/2000 | Lindberg et al. | 296/70 |
| 6,203,092 B1 | * | 3/2001 | Yoshinaka | 296/70 |
| 6,231,116 B1 | * | 5/2001 | Naert et al. | 296/70 |
| 6,234,569 B1 | * | 5/2001 | Derleth et al. | 296/70 |
| 6,237,495 B1 | * | 5/2001 | Hok et al. | 102/231 |
| 6,237,956 B1 | * | 5/2001 | Haba et al. | 180/90 |
| 6,276,739 B1 | * | 8/2001 | Wich | 296/70 |
| 2001/0047899 A1 | * | 12/2001 | Ikeda | 296/70 |

* cited by examiner

CROSS MEMBER IN A HYBRID CONSTRUCTION AND METHOD OF MAKING SAME

BACKGROUND AND SUMMARY OF THE INVENTION

This application claims the priority of German Patent Document 100 14 606.6, filed Mar. 24, 2000, the disclosure of which is expressly incorporated by reference herein.

The invention relates to a cross member in a hybrid construction, particularly for an arranging between the A-columns of a motor vehicle, which has a shell-shaped basic body, which is reinforced by means of injection-molded-on ribs made of a plastic material and in which at least one air conducting duct is provided.

Members in a hybrid construction, which can also be used for vehicle parts, are basically known from European Patent Document EP 0 370 342 B1.

A cross member of the initially mentioned type is known, for example, from German Patent Document DE-U 299 16 466. In this construction, the air conducting ducts are pulled as prefabricated tube-shaped structures after the manufacturing of the cross member under the plastic ribbing.

It is an object of the invention to construct a cross member of the initially mentioned type such that it can take over additional functions.

This object is achieved according to preferred embodiments of the invention in that the basic body is widened in the center area at least on one side and is designed as part of a housing of a heating or air conditioning system.

As a result of this construction, it is possible to use the cross member also as an importing supporting element for a heating and air conditioning system.

As a further development of certain preferred embodiments of the invention, it is provided that the air conducting ducts are molded into the cross member in one piece with the ribs and lead into the widened area. This permits a further simplification, in which case the air conducting ducts are also used as reinforcing elements.

As a further development of certain preferred embodiments of the invention, the basic body is reinforced in the widened area by at least one inserted component. This component is expediently fixed to the basic body before the latter is placed in the injection mold. The plastic material injected for reinforcing the basic body can then ensure that this inserted component is completely fixed. However, the inserted component can also be fixedly mounted on the basic body, for example, be welded to the basic body, such that a fixing by means of the injected plastic material is not required. Cold processes, such as riveting, locking, or the like, are also suitable for this fixing.

Advantageously, according to certain preferred embodiments of the invention, connections for air outlet nozzles are molded to the basic body in the widened area. These connections are therefore connected directly with a part of the housing of the heating or air conditioning system, so that no internal lines or the like have to be laid.

As a further development of certain preferred embodiments of the invention, it is provided that receiving devices and/or fastening elements for components to be arranged in the area of an instrument panel are molded to the exterior side of the basic body. Thus, the cross member is utilized as a main supporting element for the instrument panel. In this case, it is expedient for additional reinforcing elements for the basic body to be provided in the area of the receiving devices and/or fastening elements. These additional reinforcing elements can be subsequently mounted profiles or so-called "tailored blanks". It is also possible to reinforce, for example, before the insertion into the injection mold, the walls in the area of the receiving devices and/or fastening elements by means of insertion plates and/or bending, folding or corrugating or the like.

Other objects, advantages and novel features of the present invention will become apparent from the following detailed description of the invention when considered in conjunction with the accompanying drawings.

DETAILED DESCRIPTION OF THE DRAWINGS

Figure 1:
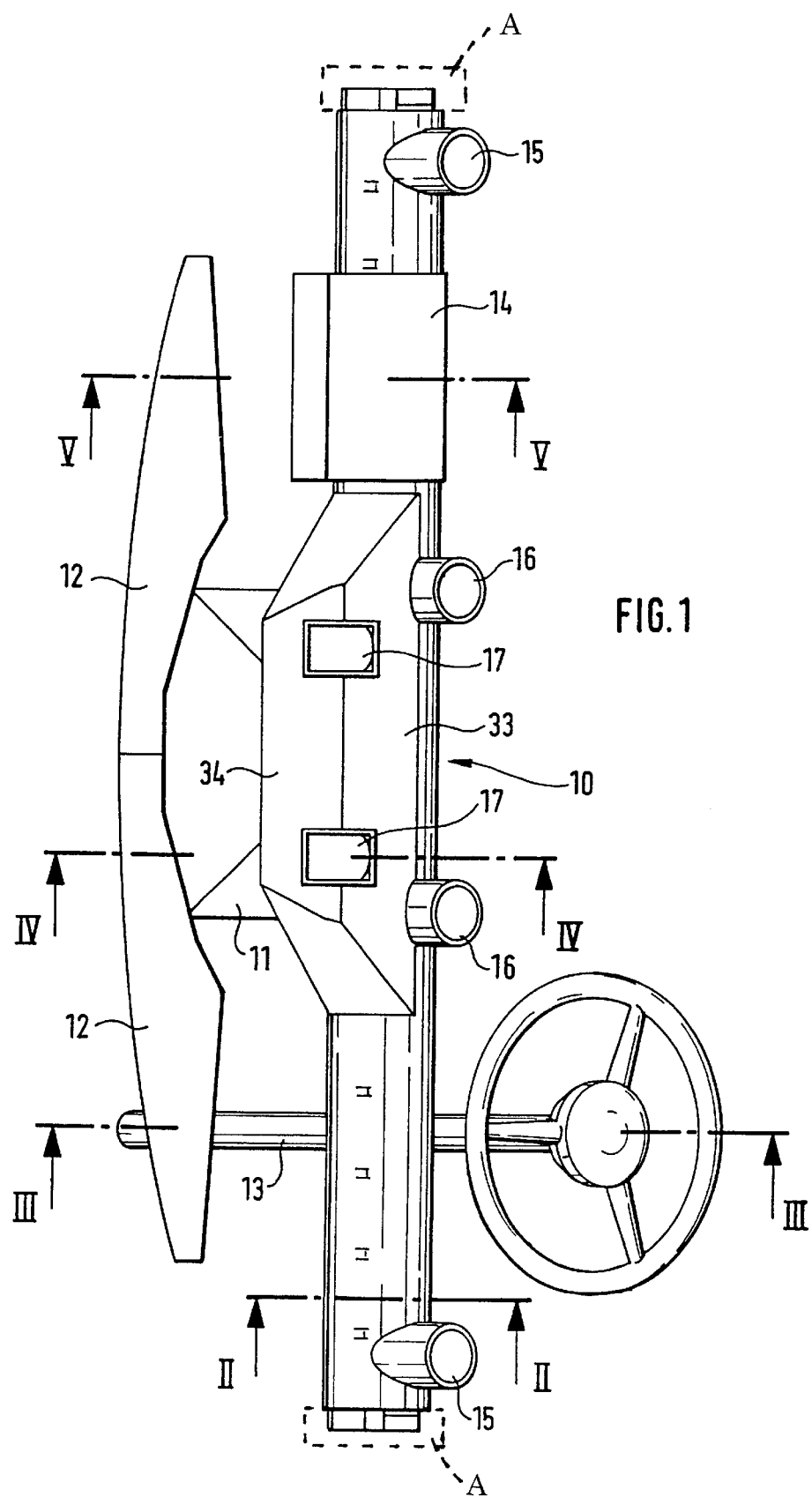
FIG. 1 is a top perspective view of a cross member according to preferred embodiments of the invention in a hybrid construction with some of the components mounted thereon.

The cross member 10 illustrated in FIG. 1 is arranged in use between the A-columns A of a motor vehicle and is utilized not only as a supporting construction but also as a functional component for additional devices, particularly for the heating and/or air conditioning system of the motor vehicle. On the cross member 10, a housing 11 of the heating or air conditioning system is mounted which, toward the front, has transversely extending flow ducts 12 for a defrosting device for a windshield. Furthermore, the cross member 10 is used for fastening the protective casing tube 13 to a bearing block or fastening component of a steering column on the driver side as well as for mounting an air bag 14 on the passenger side. In addition, the cross member 10 forms two air ducts which originate from the center area and lead to the lateral nozzles 15. From the center area of the cross member, which adjoins the housing 11, center nozzles 16, so-called person-directed flow nozzles, lead to the vehicle interior. Furthermore, upward-directed cold-air nozzles 17 start out in the area of the housing 11 from the cross member 10, which cold-air nozzles 17 have the purpose of blowing out cold air in the upward direction which will then flow along the vehicle roof into the rearward area of the vehicle occupant compartment, that is, to the rear seat row.

Figure 2:
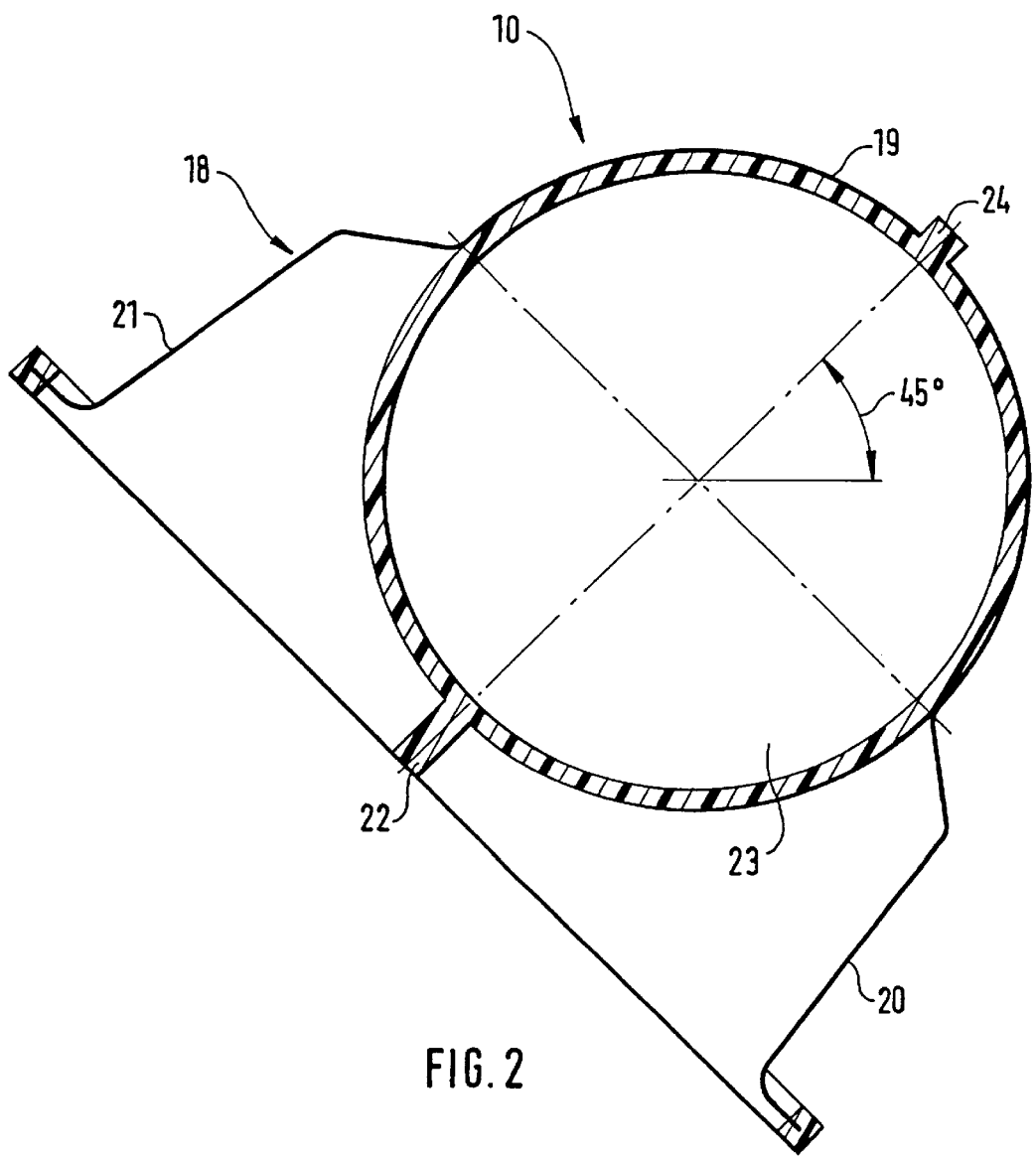
FIG. 2 is an enlarged sectional view of the cross member along Line II—II of FIG. 1.

The basic shape of the cross member 10 in the hybrid construction is illustrated in the cross-sectional view of FIG. 2. It is formed of a shell-shaped basic body 18 which is made of metal, for example, aluminum or steel, or of a plastic material. This basic body 18 is placed in an injection mold and is then reinforced by a plastic material which is injected into the injection mold. When a basic body 18 made of plastic is used, it is expedient for recycling reasons to use the same plastic material for the injection. Polypropylene or polyamide or polyurethane or other thermoplastics can preferably be used as the plastic material and can optionally be reinforced by glass fibers or carbon fibers or the like. The basic body 18 has a semi-cylindrical basic shell 19, whose edges are adjoined by legs 20, 21. For the reinforcement, the distance between the legs 20, 21 is bridged by means of plastic material which forms rhombic reinforcing ribs which cross one another approximately in the center 22. The plastic material reaches around the edges of the legs 20, 21 bent toward the outside. Likewise, transversely extending webs or combinations of different ribbings can be provided.

In addition to the shell-shaped basic body 18, cores are inserted in the injection mold, so that tube-shaped air conducting ducts 23 are injection-molded in the interior. In this embodiment, the air conducting ducts 23 are formed completely of plastic walls. As also illustrated in FIG. 2, the legs 20, 21 of the basic body 18 are bent toward the outside starting from the edges of the semi-cylindrical part 19, so that cores of a suitable shape can be inserted for forming the rhombic ribbing.

At several points, the shell-shaped basic body 18 is provided with openings, so that the plastic material will form-lockingly connect with the shell-shaped basic body 18. In the embodiment shown, a rib 24, which extends in the longitudinal direction, is provided in the center on the exterior side of the shell-shaped basic body 18. This rib 24 is preferably connected in a regularly spaced manner through openings with the plastic material injection-molded to the inside. In particular, as will be explained in the following, fastening elements made of plastic are created at several points on the exterior side of the cross member 10. As also illustrated in FIG. 2, the cross member 10 in the hybrid construction is arranged such that the legs 20, 21 point at an angle of preferably approximately 45° diagonally toward the front to the forward end of a vehicle. The angle depends on the orientation of the steering column, the air bag and the air conditioner and can therefore also have different sizes.

Figure 3:
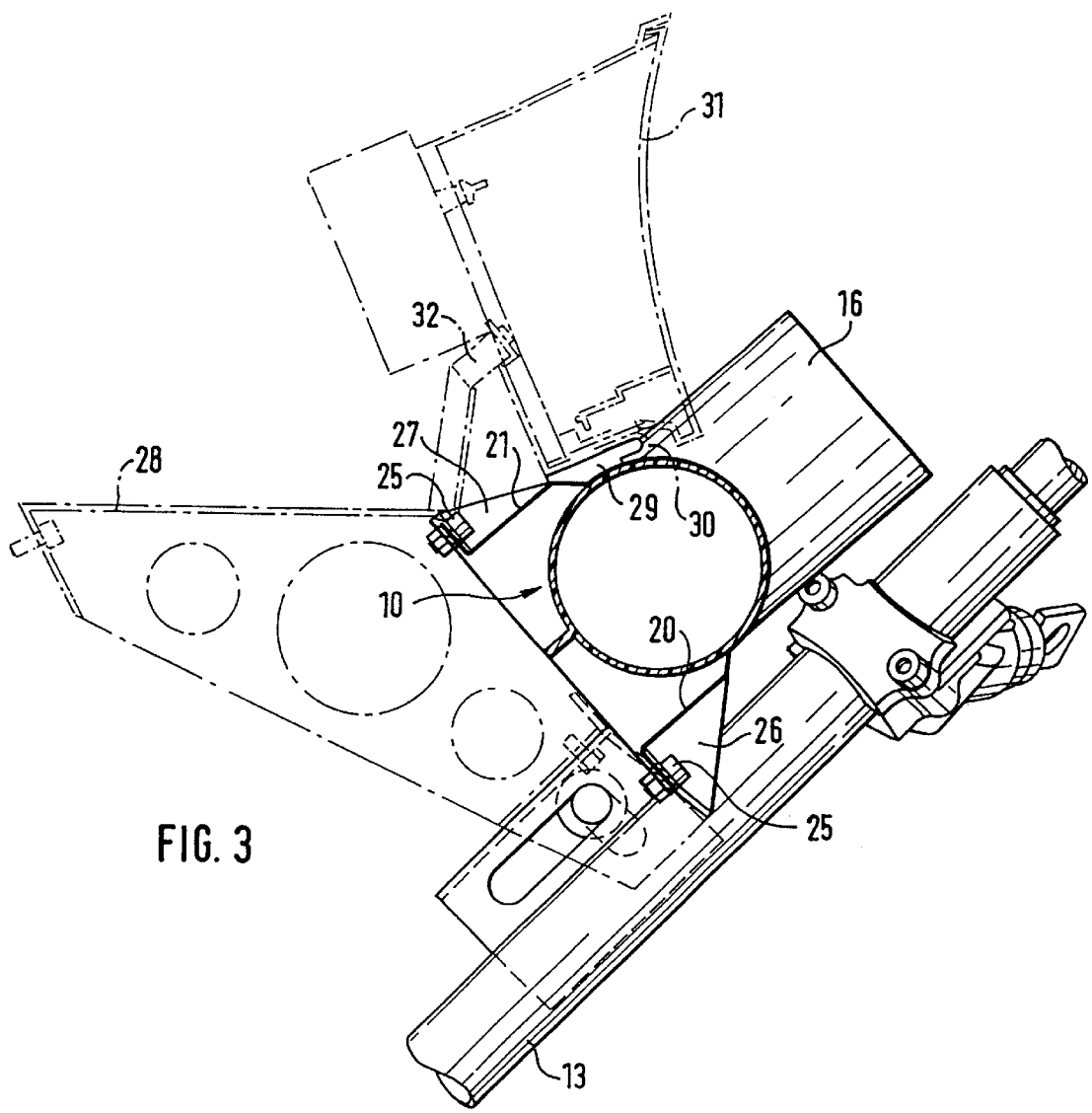
FIG. 3 is a sectional view of the embodiment according to FIG. 1 along Line III—III which is shown not quite as enlarged.

In the area of the steering column, which is illustrated in detail in FIG. 3, the bent edges of the legs 20, 21 of the cross member 10 are widened in the area of fastening points, so that they can accommodate holes for fastening screws 25. In the area of these widenings, webs 26, 27 made of plastic are injection-molded to the outside of the legs 20, 21. In a modified embodiment, the webs 26, 27 are formed as corrugations from the basic body 18. On these widened, bent ends, a plate 28, preferably made of sheet metal, is mounted for reinforcing this area. In this area, the cross member 10 is then connected by means of a bridge formed by the plate 28 with the forward front wall of the vehicle. This bridge is designed as a sheet metal construction in the form of a box-shaped profile. The steering column 13 is fastened to this bridge and thus also to the cross member 10, which steering column, in the embodiment shown, can be adjusted and fixed in the longitudinal direction and in the transverse direction. In the area illustrated in FIG. 3, a holding element 29 made of plastic is also injection-molded to the outside of the cross member 10, which holding element 29 forms a detent for a hook-shaped fastening element 30 of a speedometer 31 or an instrument cluster, which is suspended at the cross member at this point. An additional fastening takes place by means of screws on a holder 32, which is also fastened to the cross member 10, and preferably in the area of the widened bent end of the web 27.

FIG. 3 illustrates an air outlet nozzle 16, a so-called person-directed flow nozzle, which is also injection-molded in one piece from the plastic material.

Figure 4:
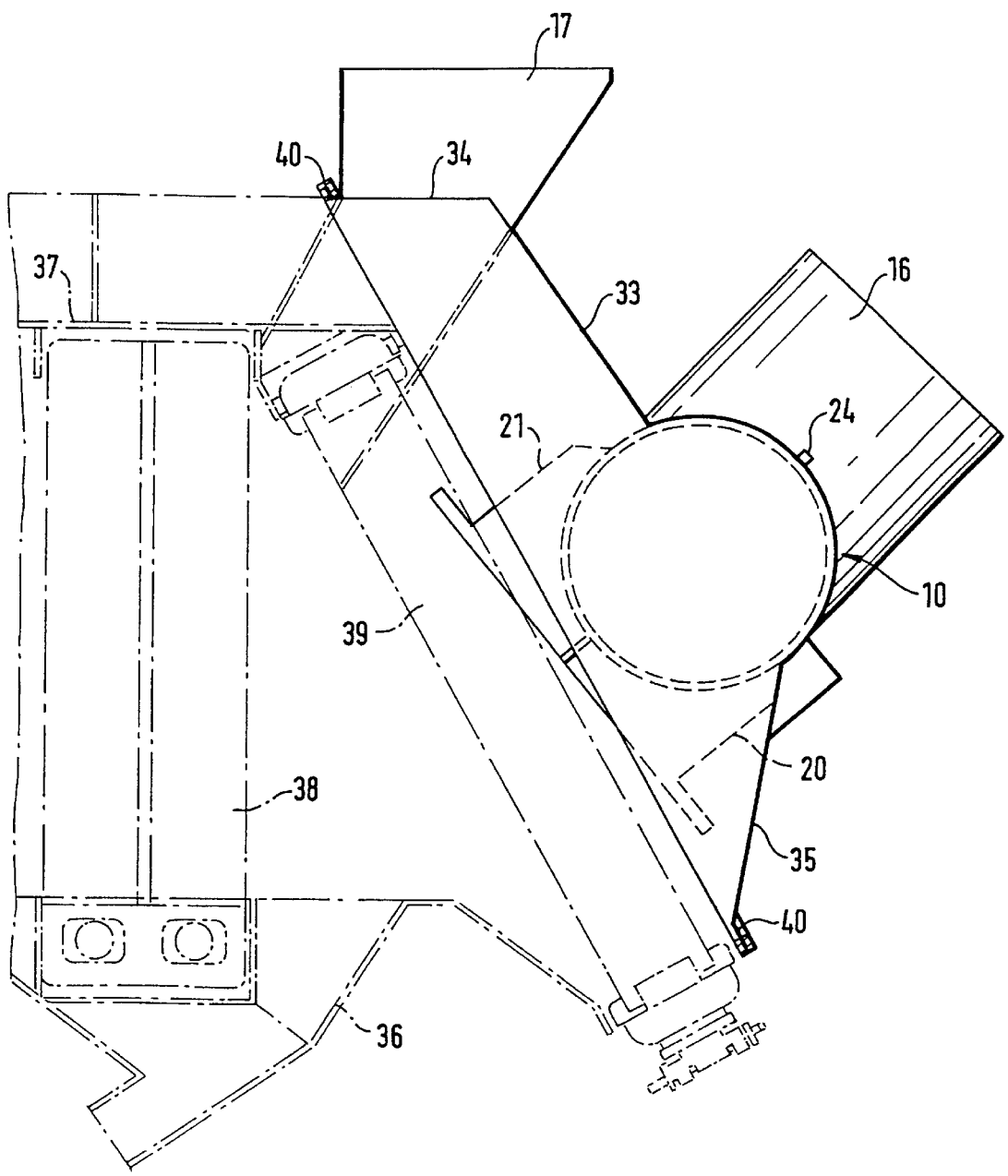
FIG. 4 is a sectional view of FIG. 1 along Line IV.

As illustrated in FIG. 1 and particularly in FIG. 4, the cross member 10 is widened in its center area; that is, the basic body 18 has a changed cross-section in this area. Instead of the leg 21, a wall 33 extends diagonally upward which then merges into an approximately horizontal section 34. Instead of the leg 20, a diagonally downward-directed wall 35 is provided. As illustrated in FIG. 1, transition pieces adjoin the walls 33, 34, 35 and connect the lateral ends of the center area again with the legs 20, 21 of the cross member 10. The center nozzles 16 or person-directed flow nozzles as well as the upper cold-air nozzles 17 adjoin this widened area of the cross member 10. This widened area of the cross member 10 is reinforced by means of inserts which are not shown in detail. In particular, an insertion, which has a triangular cross-section, is provided in the center plane, consists, for example, of the same material as the basic body 18 of the cross member and is connected with the latter by welding, gluing or the like.

The widened area of the cross member 10 is constructed as a part of a housing of a heating and air conditioning system, as illustrated in FIG. 4. This multi-part housing 36, 37, which contains an evaporator 38 and a heater 39, is sealingly fastened to the surrounding edge 40 of the widened section of the cross member 10. One of the housing parts 36 or 37 is preferably constructed in one piece with the plastic ribbing of the cross member 10.

Figure 5:
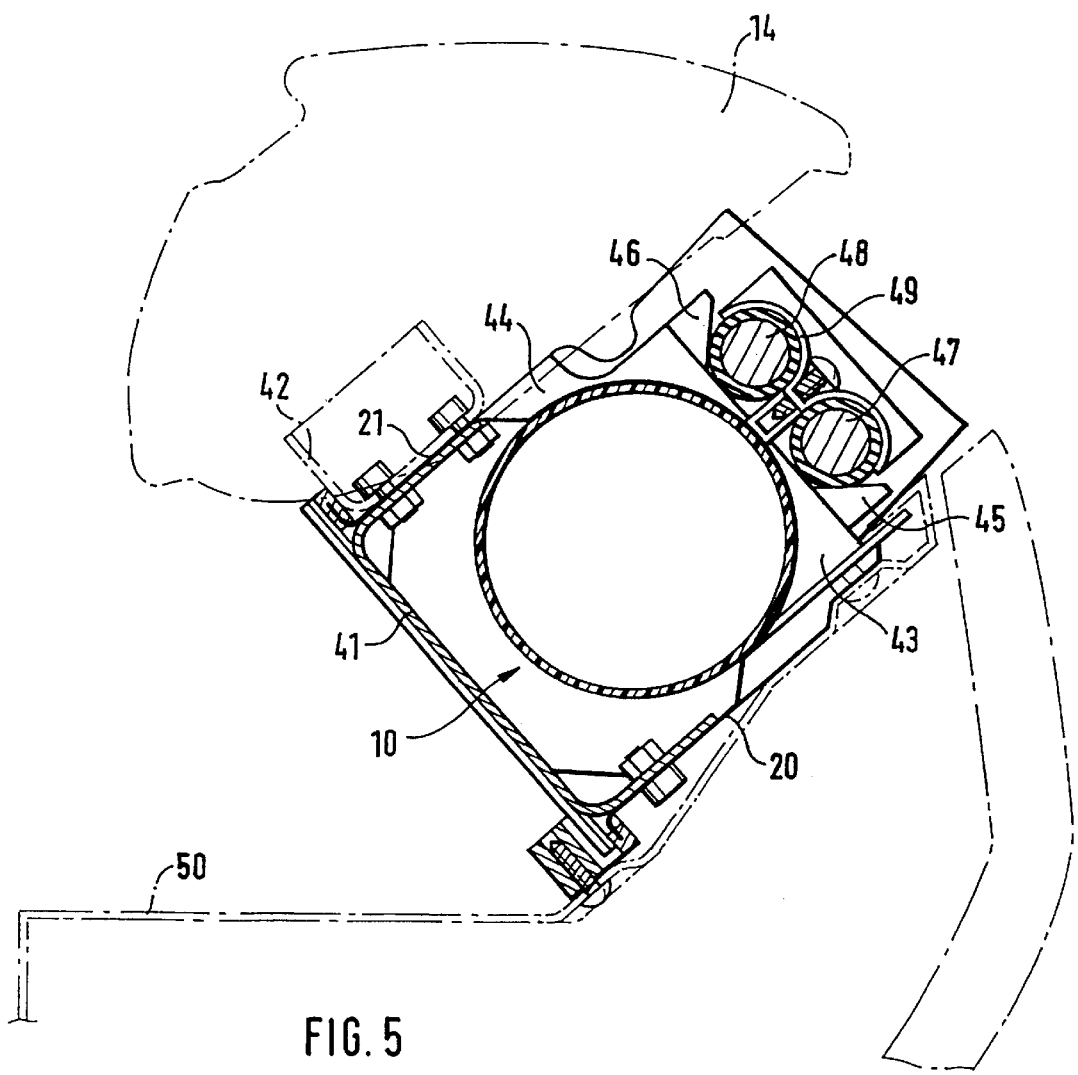
FIG. 5 is a sectional view along Line V—V of FIG. 1.

As illustrated in FIG. 5, the cross member 10 is reinforced by means of a sheet metal insert 41 in the front passenger area for receiving an air bag 14. This sheet metal insert has a U-shaped part whose legs are fitted into the recesses between the ribbing and are connected with the legs 20, 21 by means of screws. A holder 42 of the air bag housing is simultaneously fastened to the leg 21. As illustrated in FIG. 5, in this area, the cross member is reinforced by plastic preforms 43, 44 injection-molded to the outside. These plastic preforms, which are provided in a regularly spaced manner on the outside of the cross member, are provided with noses 45, 46 which are used as an insertion groove for cables 47, 48 extending along the cross member 10, which cables 47, 48 are fastened by means of clamps 49.

Furthermore, plastic holding devices are molded to the cross member 10 in the front passenger area, on which plastic holding devices the housing 50 of a glove compartment is fastened.

Figure 6:
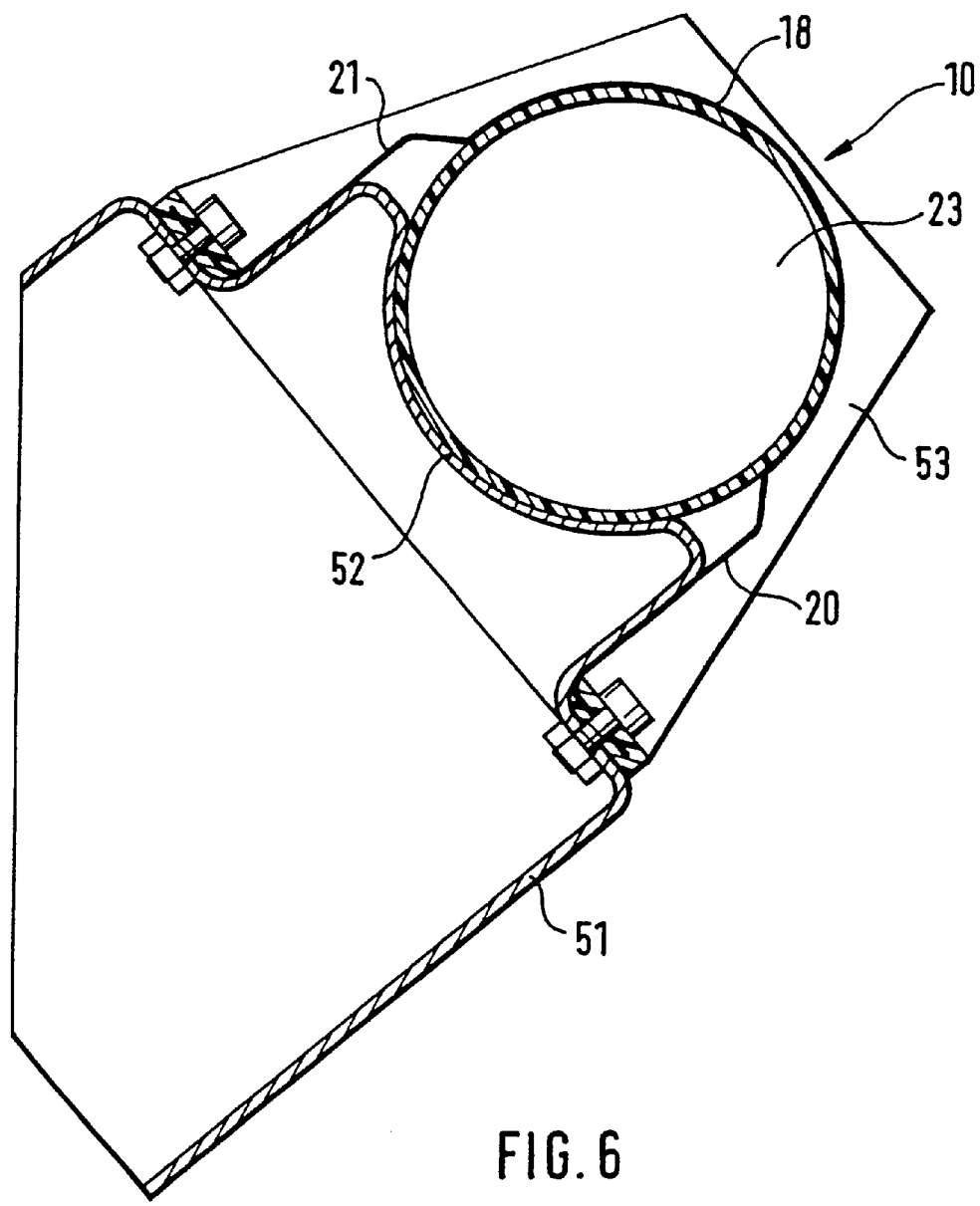
FIG. 6 is a sectional view of an end area of a modified embodiment of a cross member.

The A-columns of the vehicle are provided with consoles 51 on which the cross member 10 is fastened, for example, in the manner illustrated in FIG. 6. Also in this area, the bent edges of the legs 20, 21, around which plastic material is injected-molded, are widened and are provided with fastening holes, so that they can be connected in a flange-type manner on the console 51 by means of screws. The console is provided with a profiling 52 which penetrates into the recesses between the ribbing of the cross member and is adapted to the rounding of the air conducting duct 23.

Since the cross member 10 is to be securely held in the area of these consoles 51, it is additionally reinforced in this area by an outer ribbing 53, which is also produced in the injection molding die or by a shaping of the basic body 18.

Figure 7:
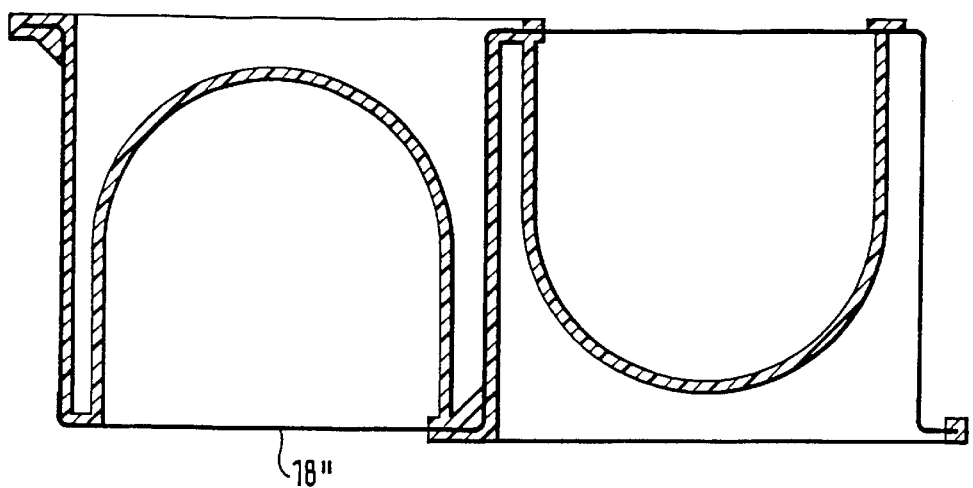
FIGS. 7 to 9 are cross-sectional views of additional embodiments for cross members in a hybrid construction.
Figure 8:
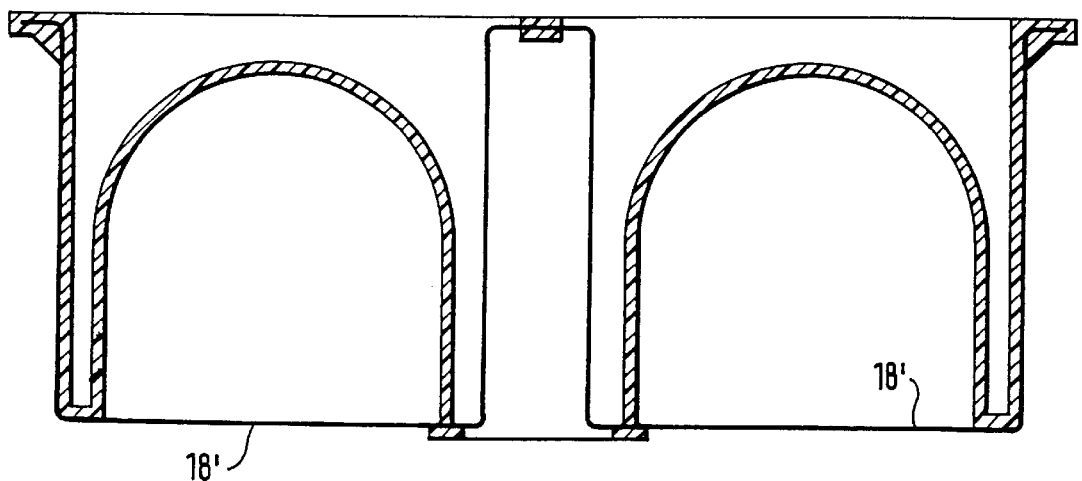
Figure 9:
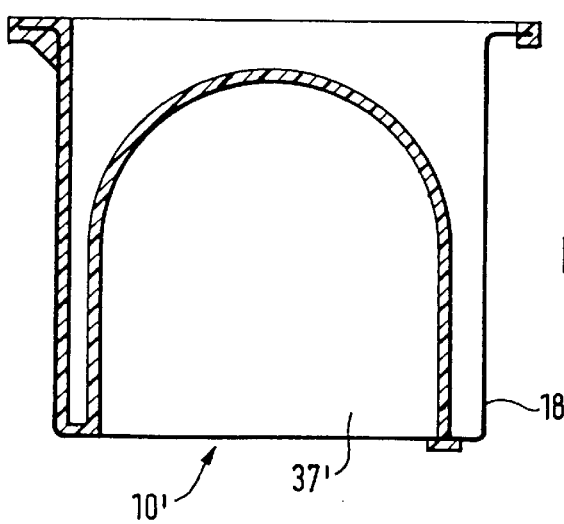

For cross members in the hybrid construction, which permit a widening in the center area forming part of a heating or air conditioning system housing, in addition to the form illustrated in FIGS. 1 to 6, other advantageous shapes exist, for example, the shape illustrated in FIGS. 7 to 9. The cross member 10' has a shell-shaped basic body 18' with a U-shaped cross-section which is reinforced between the legs by the injection of plastic material in an injection molding die, preferably in a rib shape. Together with the transverse web of the U-shaped basic body 18', this plastic material forms a one-piece air duct 37', in which case a wall is formed by the basic profile 18'. The illustration according to FIG. 9 shows sections on both sides of the dash-dotted line, which are offset by a division of the rhombic ribbing.

As illustrated, for example, in FIGS. 7 and 8, the cross member 10' can be widened in the center area such that it is virtually doubled in this area. In the embodiment according to FIG. 7, the shell-shaped basic body 18" has a meandering profile, while in the embodiment according to FIG. 8, two basic bodies 18' of the embodiment of FIG. 9 are arranged side-by-side.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A cross member which, in use, is disposed between A-columns of a motor vehicle, which has a shell-shaped basic body reinforced by injection-molded-on ribs made of a plastic material, and in which at least one air conducting duct is provided, wherein a central portion of the basic body is widened and is designed as part of a housing of a heating and/or air-conditioning system, and wherein the basic body is a prefabricated part to which said ribs are injection molded subsequently.

2. The cross member according to claim 1, wherein the at least one air conducting duct is molded into the cross member and leads into the central portion of the basic body.

3. The cross member according to claim 1, wherein said t least one air conducting duct is produced of plastic on all sides.

4. The cross member according to claim 1, wherein said at least one air conducting duct includes walls only partially formed by said plastic material, and wherein the basic body forms supplementary wall sections.

5. The cross member according to claim 1, wherein the basic body is reinforced in the central portion by at least one inserted component.

6. The cross member according to claim 1, wherein air outlet nozzles are connected in the central portion to the basic body.

7. The cross member according to claim 1, wherein the at least one air conducting duct includes two air ducts extending from said central portion and leading to lateral nozzles.

8. The cross member according to claim 1, wherein the basic body has an exterior side on which at least one holding element or preform having a nose for components to be arranged in an area of an instrument panel is molded.

9. The cross member according to claim 8, and further comprising additional reinforcing elements provided for the cross member.

10. The cross member according to claim 1, wherein the basic body has an essentially C-shaped or U-shaped cross-section so as to define legs.

11. The cross member according to claim 10, wherein the legs are bent and are widened in areas of fastening points.

12. The cross member according to claim 10, wherein the legs are provided with reinforcing webs or ribbing on exterior sides in areas of fastening points.

13. The cross member according to claim 2, wherein said at least one air conducting duct is produced of plastic on all sides.

14. The cross member according to claim 13, wherein said at least one air conducting duct includes walls only partially formed by said plastic material, and wherein the basic body forms supplementary wall sections.

15. The cross member according to claim 14, wherein the basic body is reinforced in the central portion by at least one inserted component.

16. The cross member according to claim 15, wherein air outlet nozzles are connected in the central portion to the basic body.

17. The cross member according to claim 16, wherein the at least one air conducting duct includes two air ducts extending from said central portion and leading to lateral nozzles.

18. The cross member according to claim 17, wherein the basic body has an exterior side on which at least one holding element or preform having a nose for components to be arranged in an area of an instrument panel is molded.

19. The cross member according to claim 18, and further comprising additional reinforcing elements provided for the cross member.

20. A cross member for connection between motor vehicle body columns of a motor vehicle comprising:
    a hollow shell shaped basic body defining at least one vehicle air conditioning duct, and plastic material reinforcing ribs injection molded on the basic body,
    said basic body including a central portion which is widened, which central portion forms part of a vehicle heating and/or air conditioning system when the basic body is in an in use position with said basic body connected between motor vehicle body columns,
    wherein said basic body is a prefabricated part to which said ribs are injection molded subsequently.

21. The cross member according to claim 20, wherein said basic body is formed of plural shell parts connected together.

22. The cross member according to claim 20, wherein said basic body is made of injection molded plastic material.

23. A passenger vehicle assembly comprising:
    vehicle body A-columns at respective opposite lateral sides of a vehicle passenger space, and
    a cross member with respective opposite ends connected to the respective A-columns,
    said cross member including a hollow shell shaped basic body defining at least one vehicle air conditioning duct, and plastic material reinforcing ribs injection molded on the basic body,
    said basic body including a central portion which is widened and forms part of a vehicle heating and/or air conditioning system when the basic body is in an in use position with said basic body connected to the A-columns,
    wherein said basic body is a prefabricated part to which said ribs are injection molded subsequently.

24. The passenger vehicle assembly according to claim 23, wherein said basic body is formed of plural shell parts connected together.

25. The passenger vehicle assembly according to claim 23, further comprising a vehicle steering assembly supported at said cross member.

26. A method of making a vehicle cross member, comprising:
    providing a prefabricated shell-shaped basic body which is to be connected to vehicle A-columns and including a hollow section for at least one air conditioning duct, and
    subsequently forming reinforcing ribs on the basic body by injection molding plastic thereon, wherein the basic body has a central portion which is widened and is designed as part of a housing of a heating and/or air-conditioning system.

* * * * *